United States Patent Office 3,539,366
Patented Nov. 10, 1970

3,539,366
STARCH PROCESS
Foster G. Ewing, Clinton, Iowa, assignor to Standard Brands Incorporated, New York, N.Y., a corporation of Delaware
No Drawing. Filed Sept. 10, 1968, Ser. No. 758,702
Int. Cl. C08b 29/00, 27/26
U.S. Cl. 106—213                    8 Claims

ABSTRACT OF THE DISCLOSURE

The invention relates to a process for pasting starch in the presence of a water soluble oxidizing agent. The oxidizing agent is incorporated into an aqueous slurry of starch granules in a manner such that the oxidizing agent is in contact with the starch granules for time of less than 30 seconds before the starch is subjected to starch pasting conditions. Pastes of starch prepared in this manner exhibit good temperature stability.

---

This invention relates to an improved method of pasting starch. More particularly, the present invention relates to an improved method of pasting starch in the presence of a water soluble oxidizing agent.

Application of starch to the surface of paper is generally accomplished by the use of two different types of starch containing systems. The first type is an aqueous dispersion of starch containing no other reagents except starch. This aqueous dispersion of starch is known in the art as clear size. The function of the clear size is to impart strength and print quality to paper. The other type of system contains starch, a pigment such as clay or the like and a dispersing agent such as a soluble pyrophosphate. This composition is known in the art as a coating color. The primary function of the starch in a coating color is to act as an adhesive to bind the pigment to the paper.

Pastes of unmodified starch have limited uses in the preparation of paper coatings because such pastes at desired starch solids concentration exhibit high viscosities. Starch pastes of high viscosities are not desirable since they will not flow smoothly and evenly when applied to paper in paper coating processes. Moreover, unmodified starch pastes tend to undergo considerable change in viscosity on standing which makes it difficult to control the amount of coating composition applied to paper in a continuous coating process. To overcome some of these difficulties, granular starch has been subjected to chemical modification, for example acid and sodium hypochlorite modification. When these chemically modified granular starches are pasted, pastes of relatively high starch solids content and having a suitably low viscosity can be obtained. Other processes for modifying starch include subjecting granular starch to pasting conditions in the presence of oxidizing agents such as hydrogen peroxide. Examples of such processes are those disclosed in U.S. Pat. 3,211,564 to Lauterbach and U.S. Pat. 2,307,684 to Kauffmann et al.

The process disclosed in U.S. Pat. 2,307,684 is generally considered a batch process and includes preparing an aqueous slurry of granular starch and hydrogen peroxide and heating the aqueous slurry under atmospheric conditions to paste the starch. The time required to paste the starch under atmospheric conditions is relatively long, for example, 30 minutes or longer. In the process disclosed in U.S. Pat. 3,211,564, an aqueous slurry of granular starch and hydrogen peroxide is prepared, placed in a vessel, and the starch slurry pumped from the vessel through a mixing chamber where steam is introduced in order to raise the pressure of the slurry to superatmospheric and the temperature to, for example, 305° F. In the mixing chamber, the starch is pasted. This process is generally considered to be a continuous process. These processes have a number of shortcomings. For example, it is difficult to prepare starch pastes having predictable viscosities by these processes. This is believed to be due to the fact that the starch granules are in contact with the hydrogen peroxide for relatively long and varying periods of time before the starch granules are pasted. Furthermore, and probably most important, it has been found that a long contact time between the starch granules and hydrogen peroxide, before the starch granules are pasted, is deleterious to obtaining a starch paste with good temperature stability. A starch paste with good temperature stability is a starch paste having a relatively constant paste viscosity over a relatively wide range of paste temperatures. When a starch paste has poor temperature stability there will be observed a rapid increase in the viscosity of the starch paste at decreasing paste temperatures.

It is the principal object of the present invention to provide a method for pasting granular starch in the presence of a water soluble oxidizing agent wherein a starch paste is produced having good temperature stability.

It is a further object of the present invention to provide a method for pasting a granular starch in the presence of a water soluble oxidizing agent whereby starch pastes are prepared having substantially predictable viscosities.

These objects are attained by forming an aqueous slurry of granular starch, introducing a water soluble oxidizing agent into the slurry and subjecting the slurry to starch pasting conditions, the water soluble oxidizing agent being introduced into the starch slurry in a manner such that the oxidizing agent is in contact with the granular starch for a period of time of less than 30 seconds before the starch slurry is subjected to pasting conditions.

The term "starch" as used herein includes all raw starches such as corn, tapioca, potato, wheat, milo, sago, arrowroot, rice, and the like, various modified starches and derivatives of starch such as starch esters, starch ethers and the like, and in general includes any starch which can be pasted to a viscosity such that the paste is usable to coat paper.

The granular starch may be pasted by any of the methods well known in the art. However, it is preferred to paste the starch under superatmospheric conditions at temperatures in the range of from about 300° F. to about 350° F. At a temperature below 300° F. relatively large quantities of oxidizing agent are required, and at temperatures above 350° F. there is the tendency of the starch paste to develop undesirable color. The most preferred temperature range is from about 320° F. to about 340° F., with a temperature of about 330° F. being optimum.

A variety of water soluble oxidizing agents may be used in the process of the present invention. Illustrative of water soluble oxidizing agents which may be used are the hypochlorites, persulfates, peroxides, permanganates, perborates and the like. The preferred oxidizing agent is hydrogen peroxide. The amount of hydrogen peroxide incorporated into the granular starch slurry is dependent upon a number of variables such as the concentration of the granular starch in the slurry, the viscosity desired in the starch paste and the temperature at which the pasting of the granular starch is carried out. The amount of hydrogen peroxide used may vary from about 0.035 percent to about 0.7 percent, but preferably is from about 0.1 percent to about 0.35 percent. A catalyst such as copper sulfate, ferrous sulfate or ferric sulfate may be provided in the slurry to increase the solubilizing action of the hydrogen peroxide on the starch. When copper sulfate ($CuSO_4 \cdot 5H_2O$) is used as the catalyst the preferred levels are from about 0.008 percent to about 0.03 percent. The most preferred level of copper sulfate is about 0.015 percent. At copper sulfate concentration levels below 0.008 percent, the efficiency of the process is reduced while at levels of above about 0.03 percent the temperature stability of the starch paste is reduced.

The pH of the granular starch slurry may vary but it is advantageous to provide a sufficient amount of an alkaline material in the slurry so that the pH of the resulting starch paste is in the range of from about 6 to about 7. At higher pH's there is a tendency for the paste to develop undesirable color. The preferred alkaline material is a buffering agent such as calcium carbonate.

Typically the present process is carried out by first forming a slurry of granular starch in a tank (a starch holding tank). An amount of buffering agent may be provided in the slurry such that the pH of the resulting starch paste is within the desired range of from about 6 to about 7. Also a catalyst may be provided in this slurry. The starch slurry is then pumped in the form of a stream through a confined treating zone. Steam is introduced into the starch slurry in the confined treating zone to raise the pressure of the slurry to a superatmospheric level and the temperature to a range of from about 300° F. to about 350° F. Substantially instantaneously, the starch in the treating zone is pasted. Before the starch slurry is introduced into the confined treating zone, the hydrogen peroxide is introduced into the slurry stream. The selection of the point of introduction of the hydrogen peroxide is such that the hydrogen peroxide is in contact with the granular starch in the slurry for a maximum period of time of about 30 seconds before the starch is subjected to starch pasting conditions. Preferably, the point of introduction of the hydrogen peroxide is selected such that the hydrogen peroxide is in contact with the granular starch in the slurry for a period of time of less than 4 seconds, and most preferably for a time of less than 2 seconds before the starch is subjected to starch pasting conditions. Since the steam will dilute the slurry, the slurry will generally be prepared at a higher starch solids concentration than is desired in the starch paste. The apparatus used to prepare the starch paste may be any of those known in the art, the only requirement being that the steam and the starch slurry are intimately mixed. Conventional steam mixing valves may be used for this purpose. Suitable steam mixing valves are those manufactured by Schutte and Foerting Co., Bucks County, Pa., under the trade name of Steam Jet Exhauster; those manufactured by Hydro-Thermal Corporation, Milwaukee, Wis., under the trade name of Hydroheater, and the type disclosed in U.S. Pat. 3,133,836 to V. L. Winfrey et al.

When a coating color is to be prepared, the pigment may be incorporated into the granular starch slurry before the starch is pasted or it may be incorporated into the starch paste. The latter method of incorporating the pigment is preferred.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout the specification, percentages refer to percent by weight based on the dry substance weight of the starch, unless otherwise specified.

In the above description of the present invention and in the following claims, the amount of hydrogen peroxide referred to is based on hydrogen peroxide at a theoretical concentration of 100 percent. This is done only for the purpose of describing and claiming the invention since it is contemplated that in practicing the present invention an aqueous solution of hydrogen peroxide will be used. The hydrogen peroxide used in the following examples was a 35 percent solution of hydrogen peroxide.

EXAMPLE I

This example illustrates the temperature stability of pasted starch made in accordance with the present method as compared to pasted starch made according to the teachings of the prior art.

To 326 pounds of a water slurry of granular cornstarch containing 27 percent starch, 0.3 percent calcium carbonate and 0.015 percent copper sulfate ($CuSO_4 \cdot 5H_2O$) was added 0.7 percent hydrogen peroxide while agitating the slurry. After 3 minutes and 45 seconds from the addition of the hydrogen peroxide a stream of the slurry was pumped at a rate of 0.65 gallon per minute through a one-inch diameter conduit into a Hydroheater steam mixing valve (Model A-400 manufactured by Hydro-Thermal Corp.) where steam was introduced to raise the temperature of the slurry to 330° F. This process was carried out again except that the hydrogen peroxide was continuously added to the stream of starch slurry in the conduit at a point where the hydrogen peroxide would be in contact with the granular starch for 1.5 seconds before the starch was subjected to starch pasting conditions. The amount of hydrogen peroxide added was 0.3 percent. The viscosities of pastes prepared by both methods were determined at 170°, 150°, and 130° F. These viscosities are shown in the following table.

TABLE I

| Point of addition of hydrogen peroxide | Brookfield viscosities * of the starch paste (25 percent solids) | | |
|---|---|---|---|
| | 170° F. | 150° F. | 130° F. |
| To a slurry of granular starch | 750 | 1,000 | 30,000 |
| Continuous addition of hydrogen peroxide to a stream of starch slurry such that contact time was 1.5 seconds | 1,000 | 1,500 | 2,000 |

* Viscosities determined in a Brookfield viscometer at 20 r.p.m.

From the above table, it is apparent that the temperature stability of a starch paste made in accordance with the teaching of the prior art was poor as compared to the temperature stability of a starch paste prepared in accordance with the method of the present invention.

EXAMPLE II

This example illustrates the effect of contact time of hydrogen peroxide on the granular starch slurry before the starch is subjected to starch pasting conditions.

A slurry of granular cornstarch containing 27 percent starch, 0.3 percent calcium carbonate and 0.015 percent copper sulfate ($CuSO_4 \cdot 5H_2O$) was prepared. This starch slurry was pumped through a one-inch diameter conduit into a Hydroheater steam mixing valve (Model A-400 manufactured by Hydro-Thermal Corp.) where steam was introduced to raise the temperature of the slurry to 330° F. Just prior to the steam mixing valve there was continuously introduced into the stream of starch slurry in the conduit, hydrogen peroxide. The amount of hydrogen peroxide introduced into the starch slurry was 0.7 percent. The rate at which the starch slurry was pumped through the conduit was varied, and after each variation the respective starch paste was collected. The contact times, the rate at which the slurries were pumped and the respective viscosities of the starch pastes are shown in the following table.

TABLE II

| Rate of slurry stream in gallons per minute | Brookfield viscosities * (25 percent solids) | |
|---|---|---|
| | 150° F. | 130° F. |
| Contact time (seconds): | | | |
| 2.8 ........ 0.35 | 380 | 11,700 |
| 1.8 ........ 0.55 | 360 | 3,800 |
| 1.3 ........ 0.75 | 400 | 2,500 |
| 0.9 ........ 1.00 | 360 | 1,600 |

* Viscosities determined in a Brookfield viscometer at 20 r.p.m.

From the above table, it is apparent that a slight change in contact time greatly affects the temperature stability of the starch pastes.

EXAMPLE III

This example illustrates the effect of various amounts of hydrogen peroxide on the pH of starch pastes and also illustrates the use of a buffering agent to adjust the pH of such pastes to preferred pH levels.

A slurry of granular cornstarch containing 27 percent starch and 0.015 percent copper sulfate ($CuSO_4 \cdot 5H_2O$) was prepared. This starch slurry was pumped through a one-inch diameter conduit at a rate of 0.65 gallon per minute into a Hydroheater steam mixing valve (Model A–400 manufactured by Hydro-Thermal Corp.) where steam was introduced to raise the temperature of the slurry to 330° F. Just prior to the steam mixing valve there was continuously introduced into the stream of starch slurry in the conduit various amounts of hydrogen peroxide. After each amount of hydrogen peroxide was added, the respective starch paste was collected. The hydrogen peroxide was in contact with the starch slurry for 1.5 seconds before the starch was subjected to starch pasting conditions. Another series of starch pastes was prepared in exactly the same manner except that calcium carbonate was added to the starch slurry. The pH of the starch pastes is shown in the following table.

TABLE III

| | Percent of calcium carbonate added to starch slurry | Starch paste pH |
|---|---|---|
| Percent addition hydrogen peroxide: | | |
| 1.0 | (¹) | 4.2 |
| 0.7 | (¹) | 4.8 |
| 0.5 | (¹) | 5.5 |
| 0.3 | (¹) | 6.4 |
| 1.0 | 0.3 | 6.2 |
| 0.7 | 0.3 | 6.5 |
| 0.5 | 0.3 | 6.7 |
| 0.3 | 0.3 | 7.0 |

¹ None.

As seen from the above table, it is apparent that the greater the amount of hydrogen peroxide added, the lower the pH of the respective starch paste. For some coating applications, starch pastes having low pH values are undesirable. Thus it is generally preferred that the pH of starch pastes be in the range of from about 6 to about 7. Because of this, an alkaline material such as an alkaline buffering agent should be present in the starch paste in order to obtain pastes having the preferred pH values.

EXAMPLE IV

This example illustrates the improved temperature stability of pasted starch prepared in accordance with the present method at varying hydrogen peroxide levels.

To 79 pounds of a water slurry of granular cornstarch containing 22 percent starch was added 7.1 grams of copper sulfate ($CuSO_4 \cdot 5H_2O$) and 115 grams of calcium carbonate. The pH of the slurry was 6.4. This starch slurry was pumped at a rate of 0.65 gallon per minute through a one-inch diameter conduit into a Hydroheater steam mixing valve (Model A–400 manufactured by Hydro-Thermal Corp.) where steam was introduced to raise the temperature of the slurry to 335° F. Just prior to the steam mixing valve there was continuously introduced into the stream of starch slurry in the conduit various amounts of hydrogen peroxide. After each addition of the hydrogen peroxide, the respective starch pastes were collected. The hydrogen peroxide was in contact with the starch slurry for 1.5 seconds, before the starch was subjected to starch pasting conditions. The viscosities of the starch pastes at various temperatures were determined and are shown in the following table.

TABLE IV

| | Brookfield viscosities* (20 percent solids) | | |
|---|---|---|---|
| | 150° F. | 130° F. | 110° F. |
| Percent addition of hydrogen peroxide: | | | |
| 1.0 | 40 | 46 | 60 |
| 0.7 | 80 | 116 | 300 |
| 0.5 | 152 | 350 | 8,200 |

*Viscosities determined in a Brookfield viscometer at 20 r.p.m.

EXAMPLE V

This example illustrates the preparation of starch pastes at high solids levels by the method of the present invention and the use of various amounts of hydrogen peroxide.

To a slurry containing 88 pounds of cornstarch at a starch solids concentration of 37 percent, was added 8 grams of copper sulfate ($CuSO_4 \cdot 5H_2O$) and 120 grams of calcium carbonate. The pH of the slurry was 6.5. This starch slurry was pumped at a rate of 0.65 gallon per minute through a one-inch diameter conduit into a Hydroheater steam mixing valve (Model A–400 manufactured by Hydro-Thermal Corp.) where steam was introduced to raise the temperature of the slurry to 330° F. Just prior to the steam mixing valve there was continuously introduced into the stream of starch slurry in the conduit hydrogen peroxide at two different percentage levels. After each addition of hydrogen peroxide the respective starch pastes were collected. The hydrogen peroxide was in contact with the starch slurry for 1.5 seconds before the starch was subjected to pasting conditions. The pastes had a starch concentration of 34 percent. The viscosities of the two pastes are shown in the table below.

TABLE V

| | Brookfield viscosities* (34 percent solids) | |
|---|---|---|
| | 170° F. | 150° F. |
| Percent addition of hydrogen peroxide: | | |
| 1.0 | 740 | 1,100 |
| 0.7 | 1,200 | 2,200 |

*Viscosities determined in a Brookfield viscometer at 20 r.p.m.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A method of pasting starch comprising forming an aqueous slurry of granular starch, contacting the granular starch in the slurry with a water soluble oxidizing agent and subjecting the slurry to starch pasting conditions, the granular starch being contacted with the water soluble oxidizing agent for a period of time of less than about 30 seconds before the starch slurry is subjected to starch pasting conditions.

2. A method of pasting starch as defined in claim 1, wherein the oxidizing agent is hydrogen peroxide and there is present in the slurry a catalyst which increases the effectiveness of the solubilizing action of the hydrogen peroxide on the starch.

3. A method of pasting starch as defined in claim 2, wherein the granular starch is pasted at a temperature of from about 300° to about 350° F.

4. A method of pasting starch as defined in claim 3, wherein the granular starch is pasted at a temperature of from about 320° to about 340° F.

5. A method of pasting starch as defined in claim 4, wherein the aqueous slurry of granular starch is subjected to starch pasting conditions by continuously passing a stream of aqueous slurry of granular starch through a confined treating zone wherein steam is introduced to raise the temperature thereof to from about 300° to about 350° F. and there is continuously introduced into the stream before the confined treating zone the hydrogen peroxide.

6. A method of pasting starch as defined in claim 5, wherein the amount of hydrogen peroxide continuously introduced into the stream of the aqueous slurry of granular starch is from about 0.035 to about 0.7 percent based on the dry substance weight of the starch present.

7. A method of pasting starch as defined in claim 6, wherein the amount of hydrogen peroxide continuously introduced into the stream of the aqueous slurry of granular starch is from about 0.1 to about 0.35 percent based on the dry substance weight of the starch present.

8. A method of pasting starch as defined in claim 7, wherein an amount of an alkaline buffering agent is present in the starch slurry such that the pH of the resulting starch paste is in the range of from about 6 to about 7 and the catalyst is copper sulfate and the amount thereof is from about 0.008 to about 0.03 percent based on the dry substance weight of the starch present.

References Cited
UNITED STATES PATENTS

| | | | |
|---|---|---|---|
| 3,137,592 | 6/1964 | Protzman et al. | 127—32 |
| 3,308,037 | 3/1967 | Goos et al. | 106—210 X |
| 3,374,115 | 3/1968 | Frank et al. | 127—29 |

DONALD J. ARNOLD, Primary Examiner

A. H. KOECKERT, Assistant Examiner

U.S. Cl. X.R.

260—233.3

UNITED STATES PATENT OFFICE
CERTIFICATE OF CORRECTION

Patent No. 3,539,366                Dated November 10, 1970

Inventor(s) Foster G. Ewing

It is certified that error appears in the above-identified patent and that said Letters Patent are hereby corrected as shown below:

In Claim 1, line 1, after the word "starch" insert --to improve the temperature stability thereof--; in line 6, the numeral "30" should read --2--.

Signed and sealed this 18th day of May 1971.

(SEAL)
Attest:

EDWARD M. FLETCHER, JR.            WILLIAM E. SCHUYLER, JR.
Attesting Officer                  Commissioner of Patents